United States Patent
Ogaki et al.

(10) Patent No.: US 11,292,361 B2
(45) Date of Patent: Apr. 5, 2022

(54) CHARGING SYSTEM FOR STORAGE BATTERY AND CONTROL DEVICE OF CHARGING SYSTEM FOR STORAGE BATTERY

(71) Applicant: HONDA MOTOR CO., LTD., Tokyo (JP)

(72) Inventors: Toru Ogaki, Saitama (JP); Eiki Kamaya, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 219 days.

(21) Appl. No.: 16/734,025

(22) Filed: Jan. 3, 2020

(65) Prior Publication Data
US 2020/0215931 A1 Jul. 9, 2020

(30) Foreign Application Priority Data
Jan. 9, 2019 (JP) .............................. JP2019-001679

(51) Int. Cl.
*B60L 58/25* (2019.01)
*H01M 10/44* (2006.01)
*H02J 7/00* (2006.01)

(52) U.S. Cl.
CPC ............. *B60L 58/25* (2019.02); *H01M 10/44* (2013.01); *H02J 7/007* (2013.01); *H02J 7/0029* (2013.01);
(Continued)

(58) Field of Classification Search
CPC .... B60L 58/25; B60L 2240/545; B60L 58/12; B60L 58/27; B60L 58/26; H01M 10/44;
(Continued)

(56) References Cited

U.S. PATENT DOCUMENTS

2013/0147432 A1  6/2013  Yamamoto et al.
2020/0274209 A1*  8/2020  Takazawa ........... H01M 10/625
(Continued)

FOREIGN PATENT DOCUMENTS

JP     2010-272289 A    12/2010
JP     2012-191783 A    10/2012
(Continued)

OTHER PUBLICATIONS

Nov. 24, 2020, Japanese Office Action issued for related JP Application No. 2019-001679.

*Primary Examiner* — Paul Dinh
(74) *Attorney, Agent, or Firm* — Paratus Law Group, PLLC

(57) ABSTRACT

A charging system for a storage battery, includes: a storage battery which supplies power to a motor which is a drive source for a plug-in electric vehicle; a power conversion unit which converts power supplied from an external power source and supplies the converted power to at least the storage battery; a flow path which is attached to the storage battery and the power conversion unit and through which heat medium for adjusting temperatures of the storage battery and the power conversion unit flows; a heating unit for heating the heat medium; a temperature detector for detecting the temperature of the storage battery; and a control unit which performs control to supply the converted power to the storage battery and the heating unit when the temperature of the storage battery is below a predetermined threshold value.

4 Claims, 6 Drawing Sheets

(52) U.S. Cl.
CPC ....... *H02J 7/0068* (2013.01); *B60L 2240/545* (2013.01)

(58) Field of Classification Search
CPC ............. H01M 10/443; H01M 10/615; H01M 10/625; H01M 10/63; H01M 10/6568; H01M 10/667; H01M 2220/20; H01M 10/635; H02J 7/0029; H02J 7/0068; H02J 7/007; Y02E 60/10; Y02T 10/70
USPC ........................................................ 320/150
See application file for complete search history.

(56) References Cited

U.S. PATENT DOCUMENTS

2021/0016628 A1\* 1/2021 Kozasa .............. B60H 1/00342
2021/0221254 A1\* 7/2021 Abe ........................ B60L 55/00

FOREIGN PATENT DOCUMENTS

| | | |
|---|---|---|
| JP | 2016-110957 A | 6/2016 |
| JP | 2017-117614 A | 6/2017 |
| WO | WO 2016/088475 A1 | 6/2016 |

\* cited by examiner

CHARGING SYSTEM FOR STORAGE BATTERY AND CONTROL DEVICE OF CHARGING SYSTEM FOR STORAGE BATTERY

CROSS-REFERENCE TO RELATED APPLICATIONS

The present application claims the benefit of priority of Japanese Patent Application No. 2019-001679, filed on Jan. 9, 2019, the content of which is incorporated herein by reference.

TECHNICAL FIELD

The present invention relates to a charging system for a storage battery and a control device of the charging system for the storage battery.

BACKGROUND ART

A plug-in type electric vehicle such as an electric vehicle (EV) and a hybrid electrical vehicle (HEV) provided with an electric motor driven by power supplied from a storage battery as a drive source is provided with a cooling circuit for cooling the storage battery (see International Publication No. 2016/088475 Pamphlet, for example).

International Publication No. 2016/088475 Pamphlet discloses a vehicle power supply device including a cooling circuit including a high voltage battery, a charger which charges the high voltage battery, a high voltage battery cooling unit which cools the high voltage battery, and a charger cooling unit which cools the charger.

The effective capacity (a part of the charging capacity that can be used to operate the electric vehicle) of the storage battery of the electric vehicle decreases in a low temperature environment. Therefore, in order to increase the effective capacity of the storage battery, it is effective to warm the storage battery with a heater at the time of starting or charging the electric vehicle.

According to the vehicle power supply device described in International Publication No. 2016/088475 Pamphlet, refrigerant in the cooling circuit can be heated using the heat generated when the charger charges the high-voltage battery. Therefore, the high voltage battery can be heated without using a heater. However, when the temperature of the high voltage battery is extremely low, the power that can be supplied from the charger to the high voltage battery decreases. Therefore, the emitted heat quantity of the charger is reduced, and thus it is difficult to sufficiently heat the refrigerant in the cooling circuit (heat the high voltage battery).

Therefore, it is effective to heat the refrigerant using a heater which is operated by receiving the output of the charger. However, recent plug-in type electric vehicles are required to be equipped with a heater with a large consumed electric power as the performance (vehicle output, range, charging time, start-up ensuring) required in a low temperature environment is improved. When much power output from the charger is consumed in the heater, there is a concern that the burden of electricity costs for charging the battery will increase.

SUMMARY

The invention is made in view of the circumstances described above and an object thereof is to provide a charging system for a storage battery and a control device of the charging system for the storage battery which can efficiently charge by heating the storage battery with low consumed electric power when charging the storage battery while the temperature of the storage battery is low.

According to an aspect of the invention, there is provided a charging system for a storage battery, including: a storage battery which supplies power to a motor which is a drive source for a plug-in electric vehicle; a power conversion unit which converts power supplied from an external power source and supplies the converted power to at least the storage battery; a flow path which is attached to the storage battery and the power conversion unit and through which heat medium for adjusting temperatures of the storage battery and the power conversion unit flows; a heating unit for heating the heat medium; a temperature detector for detecting the temperature of the storage battery; and a control unit which performs control to supply the converted power to the storage battery and the heating unit when the temperature of the storage battery is below a predetermined threshold value.

According to another aspect of the invention, there is provided a control device of a charging system which includes a storage battery which supplies power to a motor which is a drive source for a plug-in electric vehicle, a power conversion unit which converts power supplied from an external power source and supplies the converted power to at least the storage battery, a flow path which is attached to the storage battery and the power conversion unit and through which heat medium for adjusting temperatures of the storage battery and the power conversion unit flows, and a heating unit for heating the heat medium, the control device including: a control unit which performs control to supply the converted power to the storage battery and the heating unit when the temperature of the storage battery is below a predetermined threshold value, wherein the control unit determines first power which can be charged to the storage battery based on usable power of the converted power which can be supplied to the storage battery and the heating unit, the temperature of the storage battery, and a remaining capacity of the storage battery and determines power supplied to each of the storage battery and the heating unit based on the first power, the temperature of the storage battery, the remaining capacity of the storage battery, and the usable power.

Effects

According to the invention, it is possible to provide a charging system for a storage battery and a control device of the charging system for the storage battery which can efficiently charge by heating the storage battery with low consumed electric power when charging the storage battery while the temperature of the storage battery is low.

DESCRIPTION OF EMBODIMENTS

Hereinafter, an embodiment of the present invention will be described with reference to the drawings. A storage battery charging system of the embodiment is mounted on a plug-in type electric vehicle such as an EV or an HEV in which an electric motor driven by electric power supplied from the storage battery is provided as a drive source.

Figure 1:
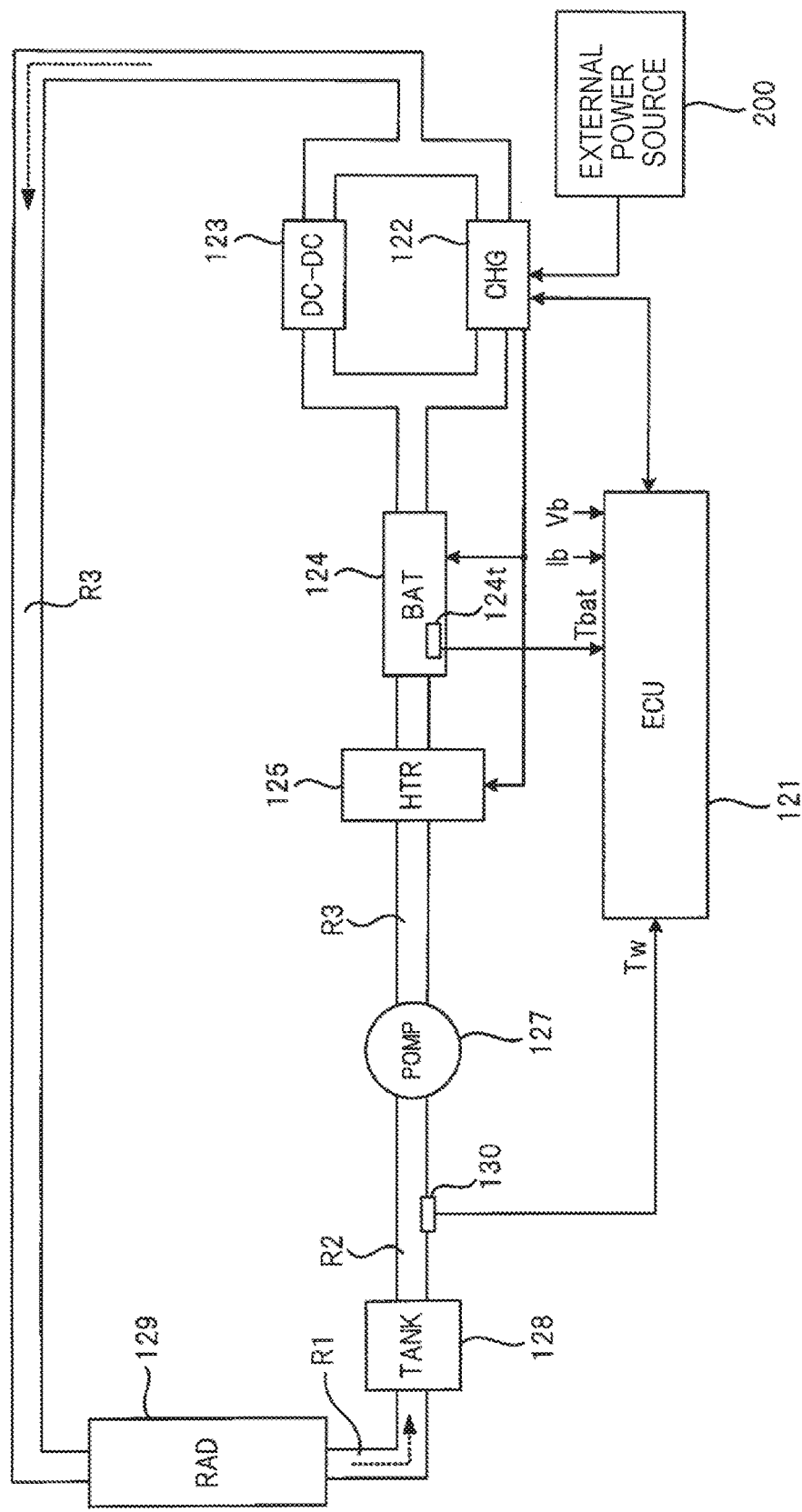
FIG. 1 is a diagram illustrating a schematic configuration of a charging system according to an embodiment of the invention.

FIG. 1 is a diagram illustrating a schematic configuration of the storage battery charging system according to the embodiment of the invention. A charging system 100 illustrated in FIG. 1 includes an electric control unit (ECU) 121, a charger 122, a DC-DC converter 123, a storage battery (BAT) 124, a temperature sensor 124t, a heater (HTR) 125, a pump 127, a tank 128 which stores a heat medium such as water or oil, a radiator (RAD) 129, a medium temperature sensor 130, and flow paths R1, R2, and R3 through which the heat medium stored in the tank 128 flows. The broken line arrow illustrated in FIG. 1 indicates a direction in which the heat medium flows.

A suction port of the pump 127 is connected to the tank 128 through the flow path R2 constituted of a pipe or the like. A discharge port of the pump 127 is connected to the flow path R3 constituted of a pipe or the like. The pump 127 sucks the heat medium stored in the tank 128 via the flow path R2 and discharges the sucked heat medium to the flow path R3.

The flow path R3 is connected to an inlet of the radiator 129. The heat medium discharged from the pump 127 to the flow path R3 flows through the flow path R3 and flows into the radiator 129. The radiator 129 dissipates the heat of the heat medium flowing in from the flow path R3 and discharges the dissipated heat medium to the flow path R1 constituted by a pipe or the like connected to the discharge port. The flow path R1 is connected to the tank 128 and the heat medium discharged from the radiator 129 returns to the tank 128 via the flow path R1.

The medium temperature sensor 130 detects the temperature of the heat medium flowing through the flow paths R1, R2, and R3. Information on a heat medium temperature Tw of the medium temperature sensor 130 is input to the ECU 121.

In the flow path R3, the heater 125, the storage battery 124, the DC-DC converter 123, and the charger 122 are provided in this order from the pump 127 side.

The heater 125 is a heating unit which heats the heat medium flowing through the flow path R3, and is configured by, for example, an electric coolant heater (ECH). The heater 125 receives power supply from the charger 122 and heats the heat medium. The heater 125 is configured such that a consumed electric power Bx (also referred to as the output of the heater 125) during operation can be switched between a plurality of values. Hereinafter, for example, it is assumed that the consumed electric power Bx can be switched by a plurality of values including 1 kw, 3 kw, and 6 kw as representative values and the maximum value of the consumed electric power Bx of the heater 125 is 6 kw. The consumed electric power Bx of the heater 125 is heating electric power used for heating the heat medium.

The storage battery 124 has a plurality of storage cells such as a lithium-ion battery or a nickel hydrogen battery.

The storage battery 124 supplies high-voltage power to an electric motor which is a drive source that generates power for the electric vehicle on which the charging system 100 is mounted to travel. The storage battery 124 is charged by receiving power from the charger 122. The temperature of the storage battery 124 is adjusted (cooled) by the heat medium flowing through the flow path R3.

When using the storage battery 124 as a secondary battery, it is necessary to always monitor the remaining capacity (state of charge (SOC)) of the storage battery 124 and perform control to prevent over-charge or over-discharge. The storage battery 124 is charged and discharged repeatedly within a SOC range (0% to 100%) in which the storage battery 124 can be used under such control. The SOC of the storage battery 124 is derived based on one or both of the integrated value of the charge/discharge current of the storage battery 124 and the open circuit voltage (OCV) of the storage battery 124.

Although not illustrated, the charging system 100 is provided with a current sensor which detects a charging/discharging current of the storage battery 124 and a voltage sensor which detects a terminal voltage (also referred to as a closed circuit voltage (CCV)) of the storage battery 124. A signal indicating the current value detected by the current sensor and a signal indicating the voltage value detected by the voltage sensor are sent to the ECU 121, respectively.

The temperature sensor 124t detects the temperature of the storage battery 124. A signal indicating the temperature of the storage battery 124 detected by the temperature sensor 124t is sent to the ECU 121.

The charger 122 converts AC power supplied from an external power source 200 into DC power. The temperature of the charger 122 is adjusted (cooled) by the heat medium flowing through the flow path R3. Similarly, the temperature of the DC-DC converter 123 is adjusted (cooled) by the heat medium flowing through the flow path R3.

The DC power converted by the charger 122 is supplied to the storage battery 124, the heater 125, and devices (for example, an audio device or an air conditioner) other than the storage battery 124 and the heater 125 mounted on the electric vehicle. Of the DC power converted by the charger 122, the power (hereinafter referred to as usable power Pa) excluding the power necessary for the operation of the device is the maximum power which can be supplied to the storage battery 124 and the heater 125.

Of the usable power Pa, the power (hereinafter referred to as charging power A) which can be charged to the storage battery 124 is determined based on the usable power Pa, the SOC of the storage battery 124, and the temperature of the storage battery 124. When the charger 122 is connected to the external power source 200, if the power source of the above-mentioned device of the electric vehicle is turned off, the DC power converted by the charger 122 is used as the usable power Pa.

The ECU 121 performs overall control of the entire charging system 100 and includes various processors which execute processing by executing programs, a random access memory (RAM), and a read only memory (ROM).

The various processors include a central processing unit (CPU), a general-purpose processor which performs various processes by executing programs or dedicated electrical circuit, such as an application specific integrated circuit (ASIC), which is a processor with a circuit configuration designed exclusively for executing specific processing. More specifically, the structures of those various processors are electric circuits in which circuit elements such as semiconductor elements are combined.

The processor of the ECU 121 may be constituted by one of various processors or may be constituted by a combination of two or more processors of the same type or different types.

Figure 2:
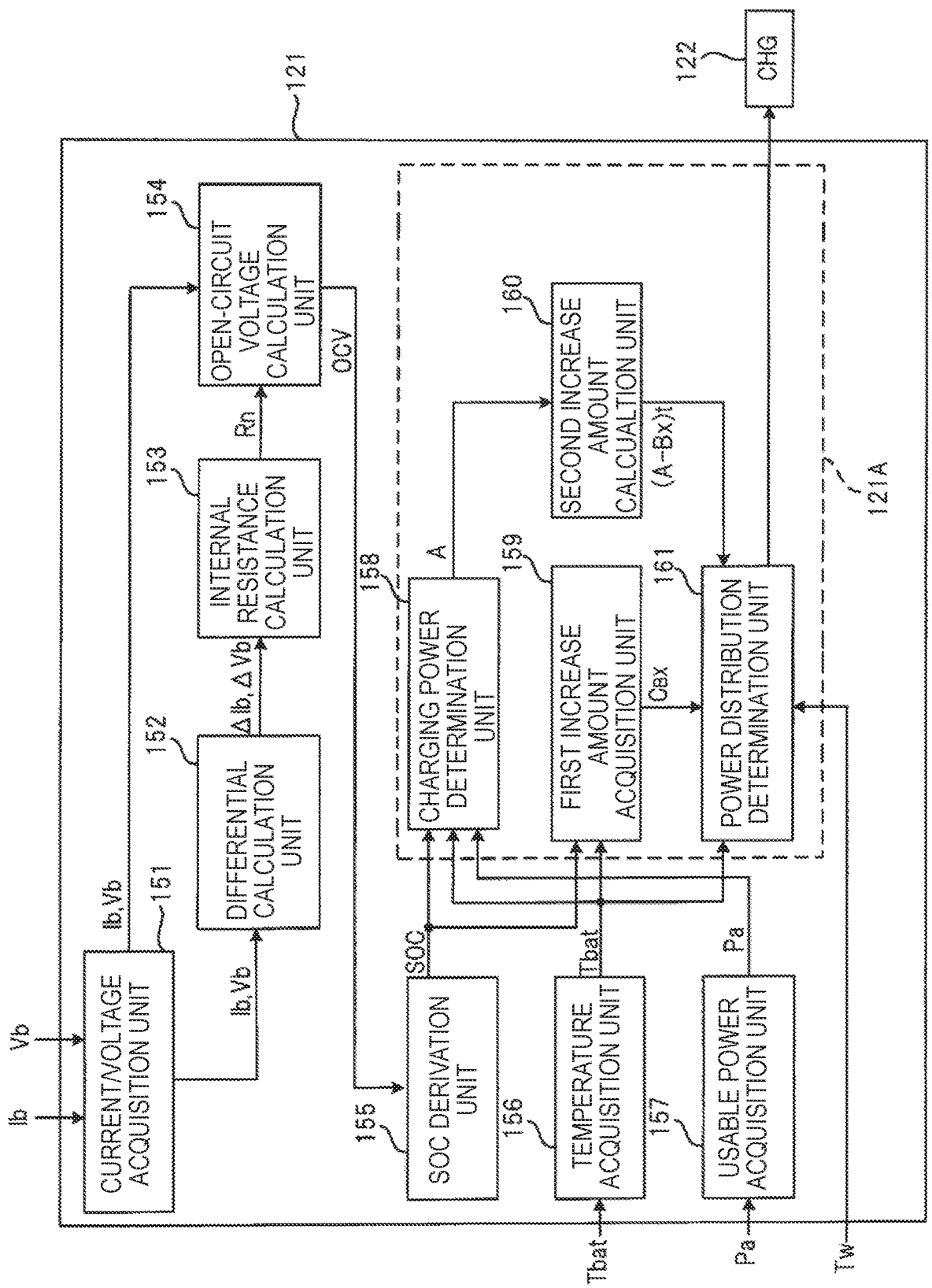
FIG. 2 is a diagram illustrating functional blocks of an ECU illustrated in FIG. 1.

FIG. 2 is a diagram illustrating functional blocks of the ECU 121 illustrated in FIG. 1. By executing the program stored in ROM, the processor of the ECU 121 functions as a current/voltage acquisition unit 151, a differential calculation unit 152, an internal resistance calculation unit 153, an open-circuit voltage calculation unit 154, an SOC derivation unit 155, a temperature acquisition unit 156, a usable power acquisition unit 157, and a control unit 121A.

The current/voltage acquisition unit 151 acquires charge/discharge current Ib of the storage battery 124 detected by the current sensor and terminal voltage Vb of the storage battery 124 detected by the voltage sensor.

The differential calculation unit 152 performs differential calculation on the charge/discharge current Ib and the terminal voltage Vb acquired by the current/voltage acquisition unit 151, respectively.

The internal resistance calculation unit 153 calculates internal resistance Rn of the storage battery 124 from the following equation (1) based on the differential value ΔIb of the charge/discharge current Ib and the differential value ΔVb of the terminal voltage Vb calculated by the differential calculation unit 152.

$$Rn = \Delta Vb/\Delta Ib \quad (1)$$

Based on the internal resistance Rn calculated by the internal resistance calculation unit 153 and the charge/discharge current Ib and terminal voltage Vb acquired by the current/voltage acquisition unit 151, the open circuit voltage calculation unit 154 calculates the open circuit voltage OCV of the storage battery 124 from the following equation (2).

$$OCV = Vb + Ib \times Rn \quad (2)$$

The SOC derivation unit 155 derives the SOC of the storage battery 124 from the open circuit voltage OCV calculated by the open-circuit voltage calculation unit 154 using a data table stored in advance in the ROM.

The temperature acquisition unit 156 acquires the temperature Tbat of the storage battery 124 detected by the temperature sensor 124t.

The usable power acquisition unit 157 acquires the information on the above-described usable power Pa from the charger 122.

The control unit 121A includes a charging power determination unit 158, a first increase amount acquisition unit 159, a second increase amount calculation unit 160, and a power distribution determination unit 161.

Based on the SOC of the storage battery 124 derived by the SOC derivation unit 155, the temperature Tbat of the storage battery 124 acquired by the temperature acquisition unit 156, and the information on the usable power Pa acquired by the usable power acquisition unit 157, the charging power determination unit 158 determines charging power A [kw].

Regarding the combination of the SOC and the temperature Tbat, the power that the storage battery 124 can accept is predetermined. The ROM of the ECU 121 stores a data table in which the combination of the SOC and the temperature Tbat is associated with power that can be received by the storage battery 124.

The charging power determination unit 158 reads the power corresponding to the combination of the SOC and the temperature Tbat from the data table and determines the read power as the charging power A when the read power is less than the usable power Pa. The charging power determination unit 158 determines the usable power Pa as the charging power A when the read power is equal to or higher than the usable power Pa.

The first increase amount acquisition unit 159 acquires a first increase amount $C_{Bx}$ of the effective capacity of the storage battery 124 when the heating medium is heated for a predetermined time (hereinafter referred to as a time t) by the heater 125 which receives each of the above-mentioned three representative consumed electric power Bx (1 kw, 3 kw, 6 kw).

In the ROM of the ECU 121, a data table which associates the combination of the temperature and SOC of the storage battery 124 with the increase amount of the effective capacity of the storage battery 124 when the heat medium is heated for the time t by the heater 125 which receives the consumed electric power Bx is stored in advance.

Figure 3:
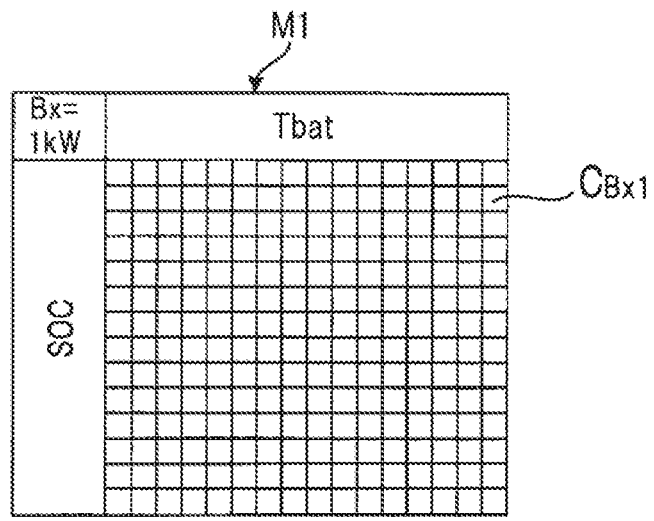
FIG. 3 is a diagram schematically illustrating a data table stored in a ROM of the ECU illustrated in FIG. 1.
Figure 3:
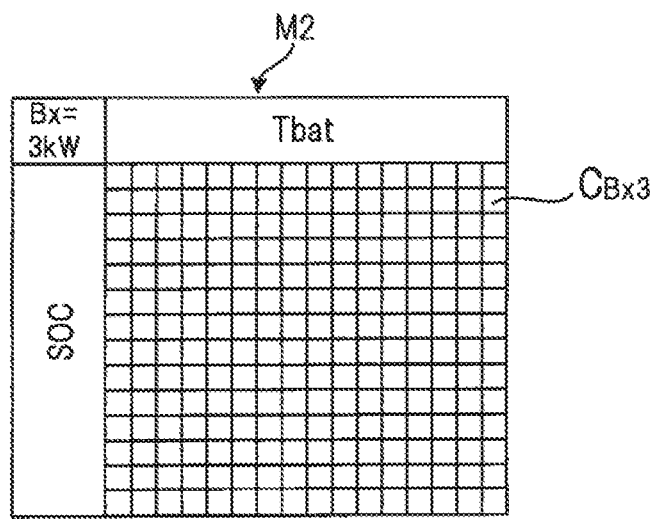
Figure 3:
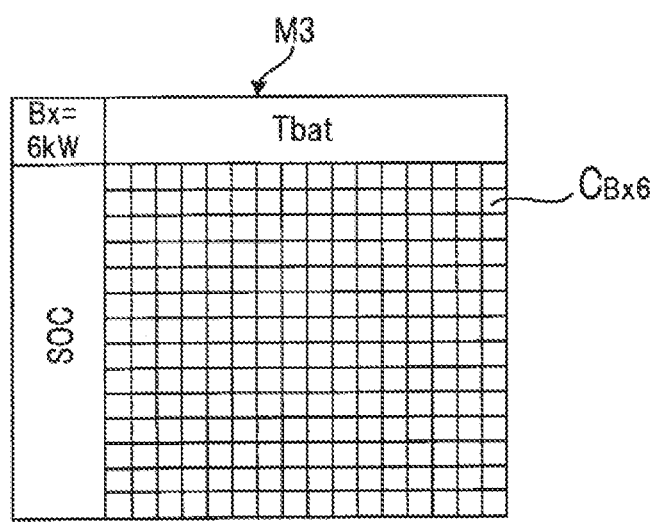

FIG. 3 is a diagram schematically illustrating a data table stored in the ROM of the ECU 121. As illustrated in FIG. 3, the ROM stores a data table M1, a data table M2, and a data table M3.

The data table M1 is a table which stores an increase amount $C_{Bx1}$ [kwh] of the effective capacity of the storage battery 124 for each combination of the SOC and the temperature Tbat at the start of heating when the heat medium is heated by the heater 125 which receives 1 kw of power for the time t.

The data table M2 is a table which stores an increase amount $C_{Bx3}$ [kwh] of the effective capacity of the storage battery 124 for each combination of the SOC and the temperature Tbat at the start of heating when the heat medium is heated by the heater 125 which receives 3 kw of power for the time t.

The data table M3 is a table which stores an increase amount $C_{Bx6}$ [kwh] of the effective capacity of the storage battery 124 for each combination of the SOC and the temperature Tbat at the start of heating when the heat medium is heated by the heater 125 which receives 6 kw of power for the time t.

From each of the data table M1, the data table M2, and the data table M3, the first increase amount acquisition unit 159 reads the increase amount $C_{Bx1}$, the increase amount $C_{Bx3}$, and the increase amount $C_{Bx6}$ corresponding to the combination of the SOC derived in the SOC derivation unit 155 and the temperature Tbat acquired in the temperature acquisition unit 156. Then, the first increase amount acquisition unit 15 acquires those increase amounts as the first increase amount $C_{Bx}$.

The second increase amount calculation unit 160 calculates, by the following equation (3), the second increase amount $D_{Bx}$ [kwh] of the effective capacity of the storage battery 124 by the charging when the storage battery 124 is charged for the time t with the power excluding the consumed electric power Bx of the charging power A determined by the charging power determination unit 158.

$$D_{Bx} = (A - Bx) \times t \quad (3)$$

The second increase amount calculation unit 160 substitutes 1 kw, 3 kw, and 6 kw, which are consumed electric powers that can be set for the heater 125, in "Bx" in the equation (3), thereby calculating three second increase amounts $D_{Bx}$ ($D_{1kw}$, $D_{3kw}$, $D_{6kw}$).

When the temperature Tbat exceeds a predetermined threshold TH1, the power distribution determination unit 161 determines the power distribution to be supplied from the charger 122 to the heater 125 and the storage battery 124 so that the power supply from the charger 122 to the heater 125 is stopped and only the storage battery 124 is supplied with power.

On the other hand, when the temperature Tbat is below the threshold TH1, the power distribution determination unit 161 supplies power to each of the heater 125 and the storage battery 124 from the charger 122 with the power distribution determined based on the first increase amount $C_{Bx}$ (increase amount $C_{Bx1}$, increase amount $C_{Bx3}$, increase amount $C_{Bx6}$), the second increase amount $D_{Bx}$ ($D_{1kw}$, $D_{3kw}$, $D_{6kw}$), the usable power Pa, the charging power A, and the heat medium temperature Tw.

Figure 4:
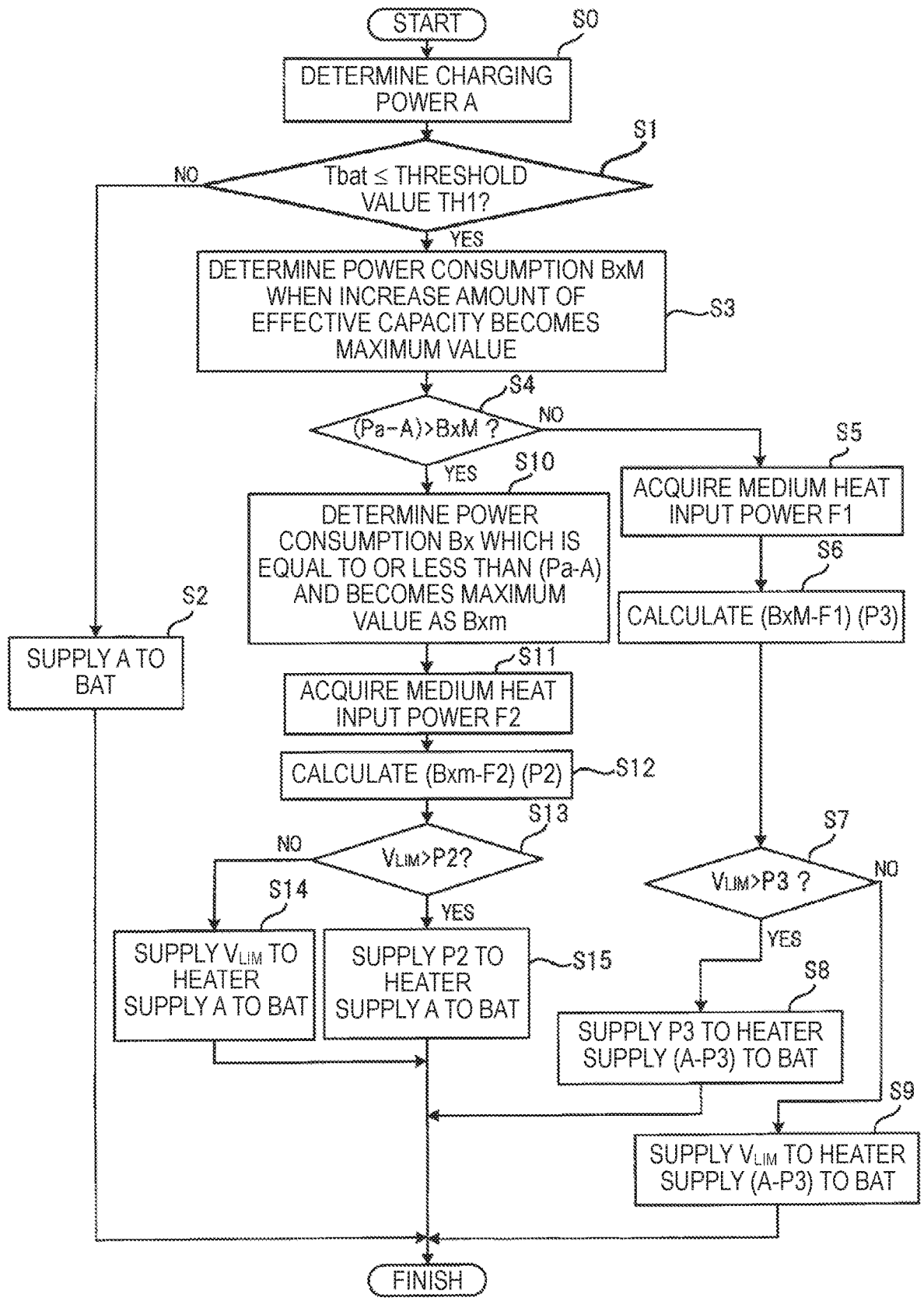
FIG. 4 is a flowchart for explaining an operation of the ECU illustrated in FIG. 1.

FIG. 4 is a flowchart for explaining the operation of the ECU 121 illustrated in FIG. 1.

When the charger 122 is connected to the external power source 200, the temperature Tbat of the storage battery 124 is acquired by the temperature acquisition unit 156 of the ECU 121 and the SOC of the storage battery 124 is derived by the SOC derivation unit 155 of the ECU 121, and further information on the usable power Pa is acquired by the usable power acquisition unit 157 of the ECU 121. Based on the information on the temperature Tbat, the SOC, and the usable power Pa, charging power A is determined by the charging power determination unit 158 of the ECU 121 (Step S0).

Next, the power distribution determination unit 161 determines whether the temperature Tbat is equal to or lower than the threshold value TH1 (Step S1). When the temperature Tbat exceeds the threshold TH1 (Step S1: NO), the power distribution determination unit 161 does not supply power to the heater 125 and the charger 122 is controlled so that charging power A determined in Step SO is supplied to the storage battery 124.

When the temperature Tbat is equal to or lower than the threshold TH1 (Step S1: YES), the power distribution determination unit 161 determines the output of the heater 125 that can maximize the increase amount of the effective capacity of the storage battery 124 (Step S3).

Specifically, based on the charging power A determined in Step S3, the data tables M1 to M3 in FIG. 3, the temperature Tbat and SOC of the storage battery 124, and the representative consumed electric power Bx, the power distribution determination unit 161 acquires the first increase amount $C_{Bx}$($C_{Bx1}$, $C_{Bx3}$, $C_{Bx6}$) and calculates the second increase amount $D_{Bx}$ ($D_{1kw}$, $D_{3kw}$, $D_{6kw}$). Then, the following equations (4) to (6) are calculated and the increase amount $E_{Bx}$ [kwh] of the effective capacity of the storage battery 124 is calculated when charging is performed for the time t while heating the heat medium by supplying 1 kw, 3 kw, and 6 kw to the heater 125, respectively.

$$E_{Bx}=D_{1kw}+C_{Bx1} \quad (4)$$

$$E_{Bx}=D_{3kw}+C_{Bx3} \quad (5)$$

$$E_{Bx}=D_{6kw}+C_{Bx6} \quad (6)$$

Next, the power distribution determination unit 161 determines the maximum value of the increase amounts $E_{Bx}$ calculated corresponding to the consumed electric powers Bx (1 kw, 3 kw, 6 kw) and specifies the consumption Bx used to calculate the determined increase amount $E_{Bx}$ of the maximum value as a consumed electric power BxM which can maximize the increase amount of the effective capacity of the storage battery 124 when the time t elapses from the present time.

For example, when the increase amount $E_{Bx}$ obtained by the equation (4) is the maximum, the power distribution determination unit 161 specifies the consumed electric power BxM as 1 kw. When the increase amount $E_{Bx}$ obtained by the equation (5) is the maximum, the power distribution determination unit 161 specifies the consumed electric power BxM as 3 kw. When the increase amount $E_{Bx}$ obtained by the equation (6) is the maximum, the power distribution determination unit 161 specifies the consumed electric power BxM as 6 kw.

Next, the power distribution determination unit 161 calculates surplus power (Pa-A) by subtracting the charging power A determined in Step SO from the usable power Pa acquired in Step S2. Then, the power distribution determination unit 161 determines whether the surplus power (Pa-A) is larger than the consumed electric power Bx M specified in Step S3 (Step S4).

When the surplus power (Pa-A) is less than the consumed electric power BxM (Step S4: NO), the power distribution determination unit 161 obtains a medium heat input power F1 indicating the amount of heat input to the heat medium in the flow path R3 by the heat generated by the charger 122 when the charger 122 outputs the charging power A determined in Step S0.

Figure 5:
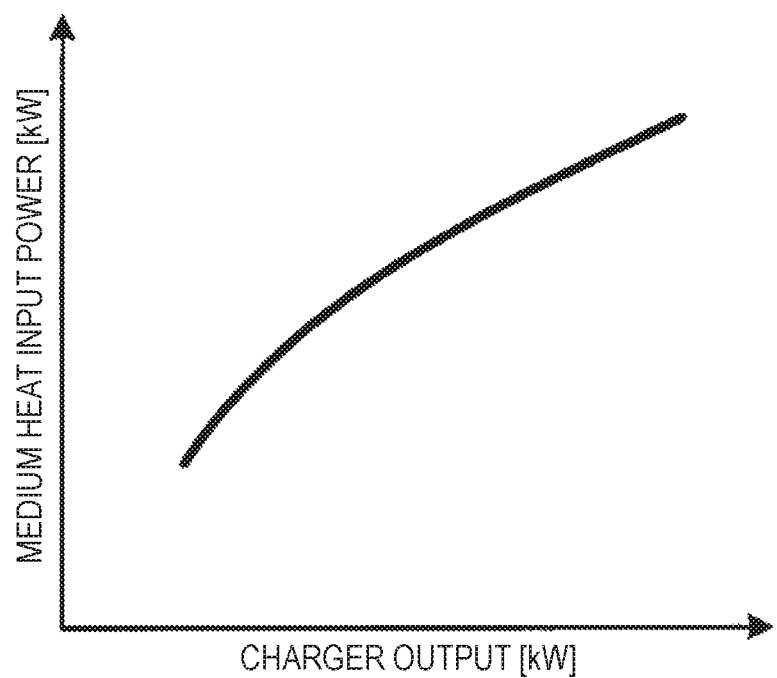
FIG. 5 is a diagram schematically illustrating data of medium heat input power stored in the ROM of the ECU illustrated in FIG. 1.

In the ROM of the ECU 121, data in which the output power to the heater 125 and the storage battery 124 from the charger 122 and the medium heat input power are associated with each other as illustrated in FIG. 5 are stored in advance. The power distribution determination unit 161 acquires the medium heat input power F1 corresponding to the charging power A from the data (Step S5).

Then, the power distribution determination unit 161 calculates third power P3 obtained by subtracting the medium heat input power F1 acquired in Step S5 from the consumed electric power BxM (Step S6). Then, the power distribution determination unit 161 determines whether the third power P3 is less than a limit power $V_{LIM}$ which is the upper limit value of the consumed electric power of the heater 125 according to the temperature of the heat medium (Step S7).

The limit power $V_{LIM}$ is a value determined by the temperature of the heat medium and is an upper limit value of the consumed electric power of the heater 125 necessary to prevent the temperature of the heat medium from exceeding a predetermined management temperature. The value of the limit power $V_{LIM}$ is stored in advance in the ROM for each heat medium temperature. The power distribution determination unit 161 acquires the temperature of the heat medium, reads out the limit power $V_{LIM}$ corresponding to the temperature, and uses it for the determination in Step S7.

When the third power P3 is less than the limit power $V_{LIM}$ (Step S7: YES), the power distribution determination unit 161 performs control to supply the third power P3 to the heater 125 and supply a fourth power P4 obtained by subtracting the third power P3 from the charging power A to the storage battery 124 (Step S8).

When the third power P3 exceeds the limit power $V_{LIM}$ (Step S7: NO), the power distribution determination unit 161 performs control for supplying the limit power $V_{LIM}$ to the heater 125 and supplying the power obtained by subtracting the limit power $V_{LIM}$ from the charging power A to the storage battery 124 (step S9).

When the surplus power (Pa-A) exceeds the consumed electric power BxM (Step S4: YES), the power distribution determination unit 161 determines a value (referred to as the consumed electric power Bxm) of the consumed electric powers Bx which is equal to or less than the surplus power (Pa-A) (step S10) and becomes the maximum value. When the charger 122 outputs the power combining the consumed electric power Bxm and the charging power A, the power distribution determination unit 161 acquires a medium heat input power F2 indicating the amount of heat input to the heat medium in the flow path R3 due to the heat generated by the charger 122 (Step S11). Specifically, the power distribution determination unit 161 obtains the medium input power corresponding to the power obtained by combining the consumed electric power Bxm and the charging power A from the data of FIG. 5.

Next, the power distribution determination unit 161 calculates a second power P2 obtained by subtracting the medium heat input power F2 acquired in Step S11 from the consumed electric power Bxm (Step S12). Then, the power distribution determination unit 161 determines whether the second power P2 is less than the limit power $V_{LIM}$ (Step S13).

When the second power P2 is less than the limit power $V_{LIM}$ (Step S13: YES), the power distribution determination unit 161 performs control to supply the second power P2 to the heater 125 and supply charging power A to the storage battery 124 (Step S15).

When the second power P2 exceeds the limit power $V_{LIM}$ (Step S13: NO), the power distribution determination unit 161 performs control to supply the limit power $V_{LIM}$ to the heater 125 and supply charging power A to the storage battery 124 (Step S14). The above process is repeated while the charger 122 is connected to the external power source 200.

As described above, according to the charging system 100 illustrated in FIG. 1, when the temperature Tbat of the storage battery 124 is equal to or lower than the threshold value TH1, power is supplied from the charger 122 to the storage battery 124 and the heater 125. Thereby, since the emitted heat quantity of the charger 122 becomes large, the heat medium is warmed by the temperature rise of charger 122. The heat medium is also warmed by the heater 125. As described above, the heat medium is warmed by both the charger 122 and the heater 125, whereby the temperature of the storage battery 124 can be increased early and the charging efficiency of the storage battery 124 can be increased. Compared with a case where the storage battery 124 is heated by warming the heat medium with the heater 125 alone, the heat medium can be sufficiently heated even when the amount of power supplied to the heater 125 is reduced. By increasing the amount of power supplied to the heater 125, the time until the temperature Tbat reaches the threshold value TH1 can be shortened. As a result, the power consumption required for heating the storage battery 124 can be reduced and the electricity cost during charging can be reduced.

According to the charging system 100, the power supplied to each of the storage battery 124 and the heater 125 is determined based on the charging power A, the temperature Tbat and SOC of the storage battery 124, and the usable power Pa. Specifically, the amount of power supplied to the storage battery 124 and the heater 125 is controlled according to the magnitude relationship between the surplus power determined by the charging power A and the usable power Pa, the charging power A, the temperature Tbat, the SOC, and consumed electric power BxM determined based on the data table in FIG. 4. Therefore, when the surplus power is large, the amount of power supplied to both the heater 125 and the storage battery 124 can be increased. Therefore, the charging efficiency of the storage battery 124 can be increased and the charging time can be shortened, and thus the electricity cost can be reduced. Since the power supplied to the heater 125 is a value obtained by subtracting the medium heat input power F2 from the consumed electric power Bxm, the power consumption can be reduced by the amount of the medium heat input power F2. As a result, electricity costs can be reduced.

When the surplus power is small, power is supplied to the heater 125 and the storage battery 124 so that the increase amount of the effective capacity of the storage battery 124 is maximized. Therefore, the effective capacity of the storage battery 124 can be maximized whenever the supply of power from the external power source 200 is stopped. Therefore, it is possible to maximize the cruising distance of the electric vehicle when charging is terminated. Here, the third power P3 supplied to the heater 125 is a value obtained by subtracting the medium heat input power F1 from the consumed electric power BxM which can maximize the effective capacity of the storage battery 124. Therefore, power consumption can be reduced by the amount of the medium heat input power F1, and thus the electricity cost for charging can be reduced.

According to the charging system 100, since the output of the heater 125 is variable, the maximum output of the heater 125 can be set to a large value. Therefore, the effects described above can be obtained while sufficiently satisfying the performance required in a low temperature environment of the electric vehicle.

Figure 6:
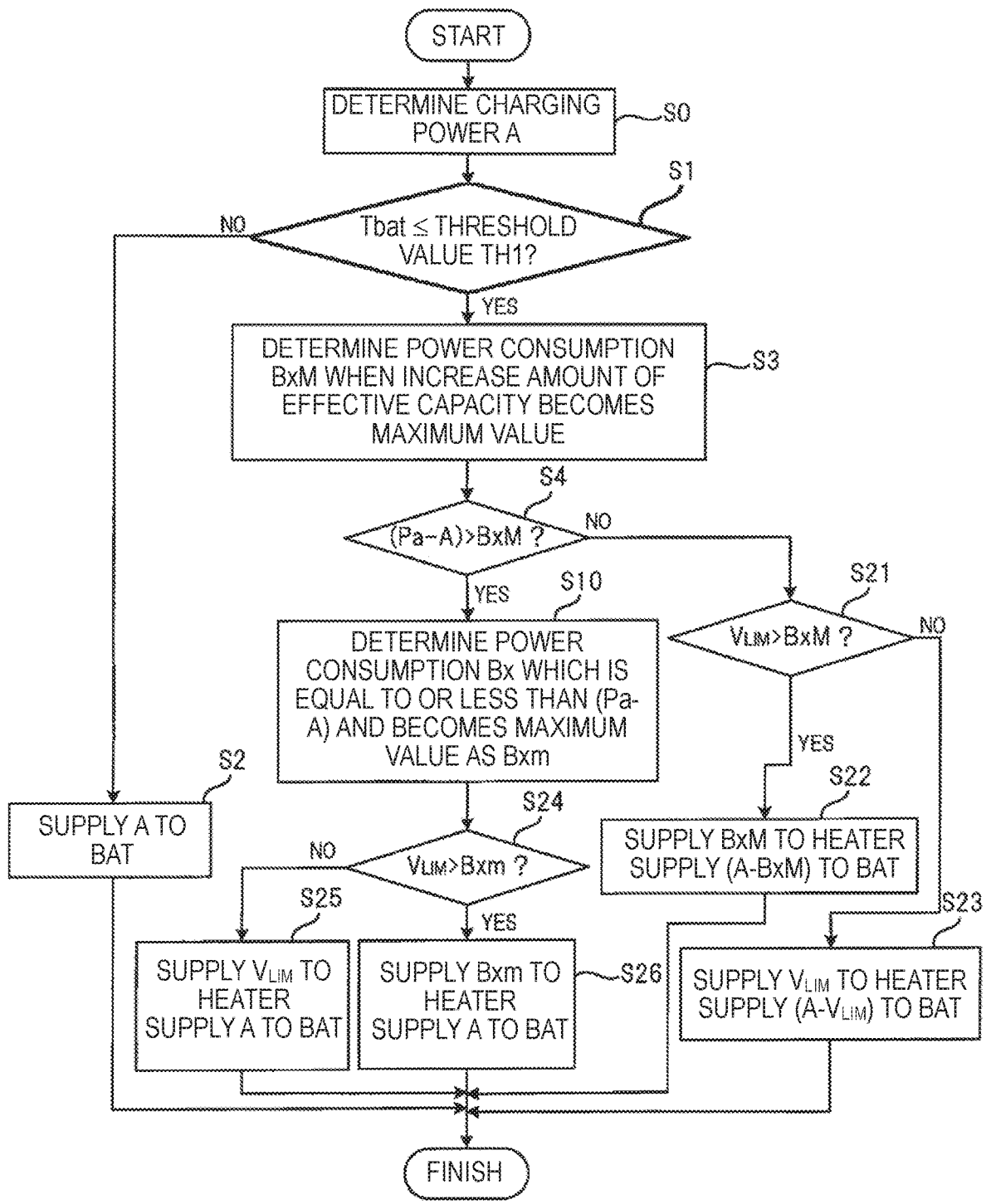
FIG. 6 is a flowchart for explaining a modified example of the operation of the ECU illustrated in FIG. 1.

FIG. 6 is a flowchart for explaining a modification example of the operation of the ECU 121 illustrated in FIG. 1. In the flowchart illustrated in FIG. 6, processes after the determination of Step S4 is set to NO and processes after Step S10 are changed from that in FIG. 4. In FIG. 6, the same reference numerals are given to the same processes as those in FIG. 4 and the description thereof will be omitted.

When the determination in Step S4 is NO, the power distribution determination unit 161 determines whether the consumed electric power BxM is less than the limit power $V_{LIM}$ (Step S21).

When the consumed electric power BxM is less than the limit power $V_{LIM}$ (Step S21: YES), the power distribution determination unit 161 performs control to supply the consumed electric power BxM to the heater 125 and supply power obtained by subtracting the consumed electric power BxM from the charging power A to the storage battery 124 (Step S22).

When consumed electric power BxM exceeds the limit power $V_{LIM}$ (Step S21: NO), the power distribution determination unit 161 performs control to supply the limit power $V_{LIM}$ to the heater 125 and supply the power obtained by subtracting the limit power $V_{LIM}$ from the charging power A to the storage battery 124 (Step S23).

After Step S10, the power distribution determination unit 161 determines whether the consumed electric power Bxm is less than the limit power $V_{LIM}$ (Step S24).

When the consumed electric power Bxm is less than the limit power $V_{LIM}$ (Step S24: YES), the power distribution determination unit 161 performs control to supply the consumed electric power Bxm to the heater 125 and supply the charging power A to the storage battery 124 (Step S26).

When the consumed electric power Bxm exceeds the limit power $V_{LIM}$ (Step S24: NO), the power distribution determination unit 161 performs control to supply the limit power $V_{LIM}$ to the heater 125 and supply the charging power A to the storage battery 124 (Step S25).

According to the modification example, the power supplied to the heater 125 when the temperature Tbat is equal to or lower than the threshold value TH1 can be optimized based on the charging power A, the usable power Pa, the temperature Tbat, the SOC, and the data table of FIG. 3. When the temperature of the heat medium rises due to the heat generated by the charger 122 which supplies power to the heater 125 and approaches the management temperature, the power supplied to the heater 125 is limited to the limit power $V_{LIM}$. In such a case, since the power supplied to the heater 125 is smaller than the consumed electric power BxM or the consumed electric power Bxm obtained as the optimum value, the power consumption can be reduced and the electricity cost can be reduced.

The specification describes at least the following matters. Although the components or the likes which correspond to those in the embodiment described above are shown in a parenthesis, it is not limited to this.

(1) A charging system (charging system 100) for a storage battery, including:

a storage battery (storage battery 124) which supplies power to a motor which is a drive source for a plug-in electric vehicle;

a power conversion unit (charger 122) which converts power supplied from an external power source (external power source 200) and supplies the converted power to at least the storage battery;

a flow path (flow path R1, R2, R3) which is attached to the storage battery and the power conversion unit and through which heat medium for adjusting temperatures of the storage battery and the power conversion unit flows;

a heating unit (heater 125) for heating the heat medium;

a temperature detector (temperature sensor 124t) for detecting the temperature of the storage battery; and a control unit (control unit 121A) which performs control to supply the converted power to the storage battery and the heating unit when the temperature of the storage battery is below a predetermined threshold value.

According to (1), when the temperature of the storage battery is lower than the threshold value, the power is supplied from the power conversion unit to the storage battery and the heating unit. Thereby, since the emitted heat quantity of the power conversion unit becomes large, the heat medium is warmed by the temperature rise of the power conversion unit. The heat medium can also be warmed by the heating unit. As described above, the heat medium is warmed by both the power conversion unit and the heating unit, so that the temperature of the storage battery can be increased early, and thus the charging efficiency of the storage battery can be increased. Compared to a case where the storage battery is heated by warming the heat medium with the heating unit alone, the amount of power supplied to the heating unit is reduced and the time until the heating unit finishes heating is shortened. As a result, the power consumption required for heating the storage battery is reduced, and thus the electricity cost during charging can reduced.

(2) The charging system for the storage battery according to (1), in which the control unit determines first power (charging power A) which can be charged to the storage battery based on usable power (usable power Pa) of the converted electric power which can be supplied to the storage battery and the heating unit, the temperature (temperature Tbat) of the storage battery, and a remaining capacity (SOC) of the storage battery and determines power supplied to each of the storage battery and the heating unit based on the first power, the temperature of the storage battery, the remaining capacity of the storage battery, and the usable power.

According to (2), it is possible to optimize the power distribution to the heating unit and the storage battery when the temperature of the storage battery is low.

(3) The charging system for the storage battery according to (2), in which the heating unit heats the heat medium by receiving any one of a plurality of pieces of heating electric power (consumed electric power Bx), a storage unit (ROM) which stores a combination of the temperature of the storage battery and the remaining capacity of the storage battery in association with an increase amount (increase amount $C_{Bx}$) of an effective capacity of the storage battery when the heat medium is heated by the heating unit which receives each of the plurality of pieces of heating electric power is provided, the control unit specifies one (consumed electric power BxM) of the plurality of pieces of heating electric power at which an increase amount of an effective capacity of the storage battery is maximized based on the first power, the increase amount for each of the plurality of pieces of heating electric power corresponding to the temperature of the storage battery and the remaining capacity of the storage battery, and the plurality of pieces of heating electric power, when surplus power (Pa-A) obtained by subtracting the first power from the usable power is larger than the specified heating electric power (consumed electric power BxM), the control unit supplies second power (second power P2) obtained by subtracting medium heat input power (medium heat input power F2) indicating a heat quantity supplied to the heat medium by heat generation of the power conversion unit based on a sum of a maximum value, which is the maximum value of the plurality of pieces of heating electric power which is equal to or less than the surplus power, and the first power from the maximum value to the heating unit and supplies the first power to the storage battery, and when the surplus power is equal to or less than the specified heating electric power, the control unit supplies third power (third power P3) obtained by subtracting medium heat input power (medium heat input power F1) indicating a heat quantity supplied to the heat medium by heat generation of the power conversion unit based on the first power from the specified heating electric power to the heating unit and supplies fourth power (fourth power P4) obtained by subtracting the specified heating electric power from the first power to the storage battery.

According to (3), when the surplus power is large, it is possible to increase the amount of power supplied to both the heating unit and the storage battery. Therefore, the charging efficiency of the storage battery can be increased to shorten the charging time, and thus the electricity cost can be reduced. Since the power supplied to the heating unit is a value obtained by subtracting the medium heat input power from the surplus power, power consumption can be reduced by the amount of the medium heat input power. As a result, the electricity cost can be reduced.

When the surplus power is small, the power is supplied to the heating unit and the storage battery so that the increase amount of the effective capacity of the storage battery is maximized. Therefore, the effective capacity of the storage battery can be maximized whenever the power supply from the external power source is stopped. Therefore, it is possible to maximize the cruising distance of the electric vehicle when charging is terminated. Here, the third power supplied to the heating unit is a value obtained by subtracting the medium heat input power from the heating electric power which can maximize the effective capacity of the storage battery. Therefore, the power consumption can be reduced by the amount of the medium heat input power, and thus the electricity cost for charging can be reduced.

(4) The charging system for the storage battery according to (3), in which the control unit acquires a first increase amount (first increase amount $C_{Bx}$) of the effective capacity of the storage battery by the heating when each of the plurality of pieces of heating electric power is supplied to the heating unit and the heat medium is heated for a predetermined time from the storage unit, calculates a second increase amount (second increase amount $D_{Bx}$) of the effective capacity of the storage battery by charge when the storage battery is charged for the predetermined time with the power obtained by subtracting each piece of heating electric power from the first electric power, calculates a total value (increase amount $E_{Bx}$) of the first increase amount and the second increase amount, and identifies the heating electric power used to calculate the maximum value of the total values as the heating electric power at which the increase amount of the effective capacity of the storage battery is maximized.

(5) A control device (ECU 121) of a charging system which includes a storage battery which supplies power to a motor which is a drive source for a plug-in electric vehicle, a power conversion unit which converts power supplied from an external power source and supplies the converted power to at least the storage battery, a flow path which is attached to the storage battery and the power conversion unit and through which heat medium for adjusting temperatures of the storage battery and the power conversion unit flows, and a heating unit for heating the heat medium, the control device including:

a control unit (control unit 121A) which performs control to supply the converted power to the storage battery and the heating unit when the temperature of the storage battery is below a predetermined threshold value, in which the control unit determines first power which can be charged to the storage battery based on usable power of the converted power which can be supplied to the storage battery and the heating unit, the temperature of the storage battery, and a remaining capacity of the storage battery and determines power supplied to each of the storage battery and the heating unit based on the first power, the temperature of the storage battery, the remaining capacity of the storage battery, and the usable power.

The invention claimed is:

1. A charging system for a storage battery, comprising:
   a storage battery which supplies power to a motor which is a drive source for a plug-in electric vehicle;
   a power conversion unit which converts power supplied from an external power source and supplies the converted power to at least the storage battery;
   a flow path which is attached to the storage battery and the power conversion unit and through which heat medium for adjusting temperatures of the storage battery and the power conversion unit flows;
   a heating unit for heating the heat medium;
   a temperature detector for detecting the temperature of the storage battery; and
   a control unit which performs control to supply the converted power to the storage battery and the heating unit when the temperature of the storage battery is below a predetermined threshold value.

2. The charging system for the storage battery according to claim 1, wherein
   the control unit determines first power which can be charged to the storage battery based on usable power of the converted electric power which can be supplied to the storage battery and the heating unit, the temperature of the storage battery, and a remaining capacity of the storage battery and determines power supplied to each of the storage battery and the heating unit based on the first power, the temperature of the storage battery, the remaining capacity of the storage battery, and the usable power.

3. The charging system for the storage battery according to claim 2, wherein:
   the heating unit heats the heat medium by receiving any one of a plurality of pieces of heating electric power;
   a storage unit which stores a combination of the temperature of the storage battery and the remaining capacity of the storage battery in association with an increase amount of an effective capacity of the storage battery when the heat medium is heated by the heating unit which receives each of the plurality of pieces of heating electric power is provided;
   the control unit specifies one of the plurality of pieces of heating electric power at which an increase amount of an effective capacity of the storage battery is maximized based on the first power, the increase amount for each of the plurality of pieces of heating electric power corresponding to the temperature of the storage battery and the remaining capacity of the storage battery, and the plurality of pieces of heating electric power;
   when surplus power obtained by subtracting the first power from the usable power is larger than the specified heating electric power, the control unit supplies second power obtained by subtracting medium heat input power indicating a heat quantity supplied to the heat medium by heat generation of the power conversion unit based on a sum of a maximum value, which is the maximum value of the plurality of pieces of heating electric power which is equal to or less than the surplus power, and the first power from the maximum value to the heating unit and supplies the first power to the storage battery; and
   when the surplus power is equal to or less than the specified heating electric power, the control unit supplies third power obtained by subtracting medium heat input power indicating a heat quantity supplied to the heat medium by heat generation of the power conversion unit based on the first power from the specified heating electric power to the heating unit and supplies fourth power obtained by subtracting the specified heating electric power from the first power to the storage battery.

4. The charging system for the storage battery according to claim 3, wherein
   the control unit acquires a first increase amount of the effective capacity of the storage battery by the heating when each of the plurality of pieces of heating electric power is supplied to the heating unit and the heat medium is heated for a predetermined time from the storage unit, calculates a second increase amount of the effective capacity of the storage battery by charge when the storage battery is charged for the predetermined time with the power obtained by subtracting each piece of heating electric power from the first electric power, calculates a total value of the first increase amount and the second increase amount, and identifies the heating electric power used to calculate the maximum value of the total values as the heating electric power at which the increase amount of the effective capacity of the storage battery is maximized.

* * * * *